(12) United States Patent
Kim

(10) Patent No.: US 7,705,774 B2
(45) Date of Patent: Apr. 27, 2010

(54) METHOD OF PROVIDING CELESTIAL INFORMATION AND A MOBILE TERMINAL HAVING A FUNCTION OF PROVIDING THE CELESTIAL INFORMATION

(75) Inventor: Myoung Jae Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/649,283

(22) Filed: Jan. 4, 2007

(65) Prior Publication Data
US 2007/0159390 A1    Jul. 12, 2007

(30) Foreign Application Priority Data

Jan. 6, 2006  (KR) ...................... 10-2006-0001794
Jan. 6, 2006  (KR) ...................... 10-2006-0001882

(51) Int. Cl.
*G01S 1/00* (2006.01)
(52) U.S. Cl. .............................................. 342/357.01
(58) Field of Classification Search ................ 342/357.01–357.17; 340/686.1; 434/106
See application file for complete search history.

(56) References Cited

U.S. PATENT DOCUMENTS

| | | | | |
|---|---|---|---|---|
| 4,903,212 A | * | 2/1990 | Yokouchi et al. ............ | 701/216 |
| 5,155,688 A | * | 10/1992 | Tanaka et al. ............... | 701/221 |
| 5,379,045 A | * | 1/1995 | Gilbert et al. .......... | 342/357.03 |
| 5,574,465 A | * | 11/1996 | Okada ........................ | 342/352 |
| 7,197,829 B2 | * | 4/2007 | Acres .......................... | 33/268 |
| 2002/0128775 A1 | * | 9/2002 | Brodie et al. ............... | 701/216 |
| 2005/0046581 A1 | * | 3/2005 | Lemp, III ................ | 340/686.1 |
| 2006/0158722 A1 | * | 7/2006 | Fujimoto et al. ............ | 359/399 |
| 2006/0259574 A1 | * | 11/2006 | Rosenberg ................ | 709/217 |
| 2006/0284765 A1 | * | 12/2006 | Bernhardt et al. ...... | 342/357.09 |

FOREIGN PATENT DOCUMENTS

| | | |
|---|---|---|
| EP | 0650071 A1 | 4/1995 |
| WO | WO-98/55833 A1 | 12/1998 |
| WO | WO-01/46648 A1 | 6/2001 |

* cited by examiner

*Primary Examiner*—Thomas H Tarcza
*Assistant Examiner*—Nga X Nguyen
(74) *Attorney, Agent, or Firm*—Birch, Stewart, Kolasch & Birch, LLP

(57) ABSTRACT

A mobile terminal and a method of outputting celestial information using the terminal are disclosed. The mobile terminal includes a memory unit storing celestial information, an information acquiring unit acquiring terminal position information, terminal direction information including an azimuth and an altitude of the terminal, and time information, and an information processing unit searching the memory unit and outputting the celestial information corresponding to the position information, the direction information and the time information received from the information acquiring unit. It is possible to provide the celestial information of the sky located in a direction corresponding to the azimuth and the altitude of the terminal and to rapidly and conveniently find a celestial body a user wishes to observe.

21 Claims, 9 Drawing Sheets

METHOD OF PROVIDING CELESTIAL INFORMATION AND A MOBILE TERMINAL HAVING A FUNCTION OF PROVIDING THE CELESTIAL INFORMATION

This application claims the priority benefit of Korean Patent Application No. 10-2006-0001794, filed on Jan. 06, 2006 and Korean Patent Application No. 10-2006-0001882, filed on Jan. 06, 2006, which are hereby incorporated by reference as if fully set forth herein.

BACKGROUND OF THE INVENTION

1. Field of the Invention

The present invention relates to a method of outputting celestial information and a mobile terminal having a function of outputting celestial information.

2. Discussion of the Related Art

With rapid developments in mobile communication technologies and mobile terminals, the mobile terminals are being equipped with more and more variety of functions. As representative examples of the functions, the mobile terminal may include music function (e.g., MP3) for listening to music or a camera function for photographing a still image and/or a moving image (e.g., digital camera).

Meanwhile, newer mobile terminals are designed with a variety of functions to accommodate a variety of desires of users, thus increasing product competitiveness of the mobile terminal. That is, the variety of functions for the user's interest and convenience are being added to the mobile terminals.

Such a mobile terminal with increased functions can include additional function such as providing information on a celestial body such as stars in the sky or constellations. For example, the mobile terminal can display a constellation of the celestial bodies on a screen to arouse interest of the user. However, the mobile terminal cannot provide detailed practical information on the celestial body to the user, in addition to basic information on the celestial body. That is, the mobile terminal cannot provide practical information to the user using celestial information, in addition to simple information for arousing interest of the user.

SUMMARY OF THE INVENTION

Accordingly, the present invention is directed to a method of guiding a celestial direction and a mobile terminal having a celestial direction guiding function that substantially obviate one or more problems due to limitations and disadvantages of the related art.

An object of the present invention is to provide a mobile terminal for providing practical celestial information and a method of outputting the celestial information.

Another object of the present invention is to provide a method of outputting a celestial direction, which is capable of guiding the position of a celestial body a user wants to find as well as providing celestial information of the sky which is located in a direction corresponding to an azimuth and an altitude of a terminal, and a mobile terminal having a celestial direction guiding function.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes an input unit for receiving a name of a celestial body, a memory unit for storing celestial information including position information of the celestial body on a celestial sphere matched to the name of the celestial body, an information acquiring unit for acquiring terminal position information, terminal direction information, and time information, and an information processing unit for comparing the position information of the celestial body and the terminal direction information, determining whether a difference between the position information of the celestial body and the terminal direction information falls within an error range, and outputting information on a change in terminal direction if the difference falls outside the error range.

In another aspect of the present invention, there is provided a mobile terminal including a memory unit for storing celestial information, an information acquiring unit for acquiring terminal position information, terminal direction information including an azimuth and an altitude of the terminal, and time information, and an information processing unit for searching the memory unit and outputting the celestial information corresponding to the position information, the direction information and the time information received from the information acquiring unit, wherein the information processing unit updates and outputs the celestial information depending on a change in at least one of the position information, the direction information and the time information.

In another aspect of the present invention, there is provided a method of outputting celestial information including acquiring terminal position information, terminal direction information including an azimuth and an altitude, and time information, and outputting the celestial information corresponding to the position information, the direction information and the time information.

In another aspect of the present invention, there is provided a method of outputting celestial information using a mobile terminal comprising: receiving a name of a celestial body, acquiring position information of the mobile terminal, celestial position information indicating the position of the celestial body on a celestial sphere corresponding to the received name of the celestial body, and a terminal direction position information indicating the position of the celestial sphere toward which the terminal is directed, comparing the acquired celestial position information and the acquired terminal direction position information, and outputting information on a change in terminal direction necessary for matching the celestial position information and the terminal direction position information, if the celestial position information and the terminal direction position information are not matched as the result of comparison.

The celestial position information and the terminal direction position information may be represented in different coordinate systems.

The position information of the celestial body may be represented in an equatorial coordinate system and the terminal direction position information may be represented in a horizontal coordinate system.

The mobile terminal may further include an operation recognizing module for recognizing movement of the terminal and a direction recognizing module recognizing the direction of the terminal.

The operation recognizing module may be any one of an acceleration sensor and a gyro sensor and the direction recognizing module may be a geomagnetic sensor.

The mobile terminal may further include a GPS signal receiving unit receiving a GPS signal, and a mobile communication module transmitting/receiving data to/from a mobile network, and the information acquiring unit may acquire the terminal position information using the GPS signal received via the GPS signal receiving unit and acquire the time information using a mobile communication base station system parameter received via the mobile communication module.

The information acquiring unit may acquire at least one of the position information, the direction information and the time information via the input unit.

The information processing unit may convert the celestial position information from the equatorial coordinate system into the horizontal coordinate system using the acquired terminal position information and time information, compare the converted celestial position information and the terminal direction position information represented in the horizontal coordinate system, and calculate information on a change in terminal direction.

The information processing unit may convert the terminal direction position information from the horizontal coordinate system into the equatorial coordinate system, compare the converted terminal direction position information and the celestial position information represented in the equatorial coordinate system, and calculate information on a change in terminal direction.

The information on the change in the terminal direction includes the direction respect to which the change occurred and the difference in the terminal direction. The mobile terminal may further include an audio output unit and the information processing unit may audibly output the information in the change in the terminal direction via the audio output unit.

In another aspect of the present invention, there is provided a method of outputting celestial information using a mobile terminal including receiving a name of a celestial body, acquiring position information of the mobile terminal, celestial position information indicating the position of the celestial body on a celestial sphere corresponding to the received name of the celestial body, and a terminal direction position information indicating the position of the celestial sphere toward which the terminal is directed, comparing the acquired celestial position information and the acquired terminal direction position information; and outputting information on a change in terminal direction necessary for matching the celestial position information and the terminal direction position information, if the celestial position information and the terminal direction position information are not matched as the result of comparison.

The step of acquiring the celestial position information may be acquired by referring to a database in which the name of the celestial body is matched to the equatorial coordinate.

The step of acquiring the terminal direction position information may comprise acquiring the terminal position information, the terminal direction information and the time information and acquiring the terminal direction position information which corresponds to the terminal position information, the terminal direction information and the time information and is represented in the horizontal coordinate system. The comparing step may include converting the celestial position information from the equatorial coordinate system into the horizontal coordinate system and comparing the celestial position information converted into the horizontal coordinate system and the terminal direction position information represented in the horizontal coordinate system.

The comparing step may include converting the terminal direction position information from the horizontal coordinate system into the equatorial coordinate system and comparing the terminal direction position information converted into the equatorial coordinate system and the celestial position information represented in the equatorial coordinate system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
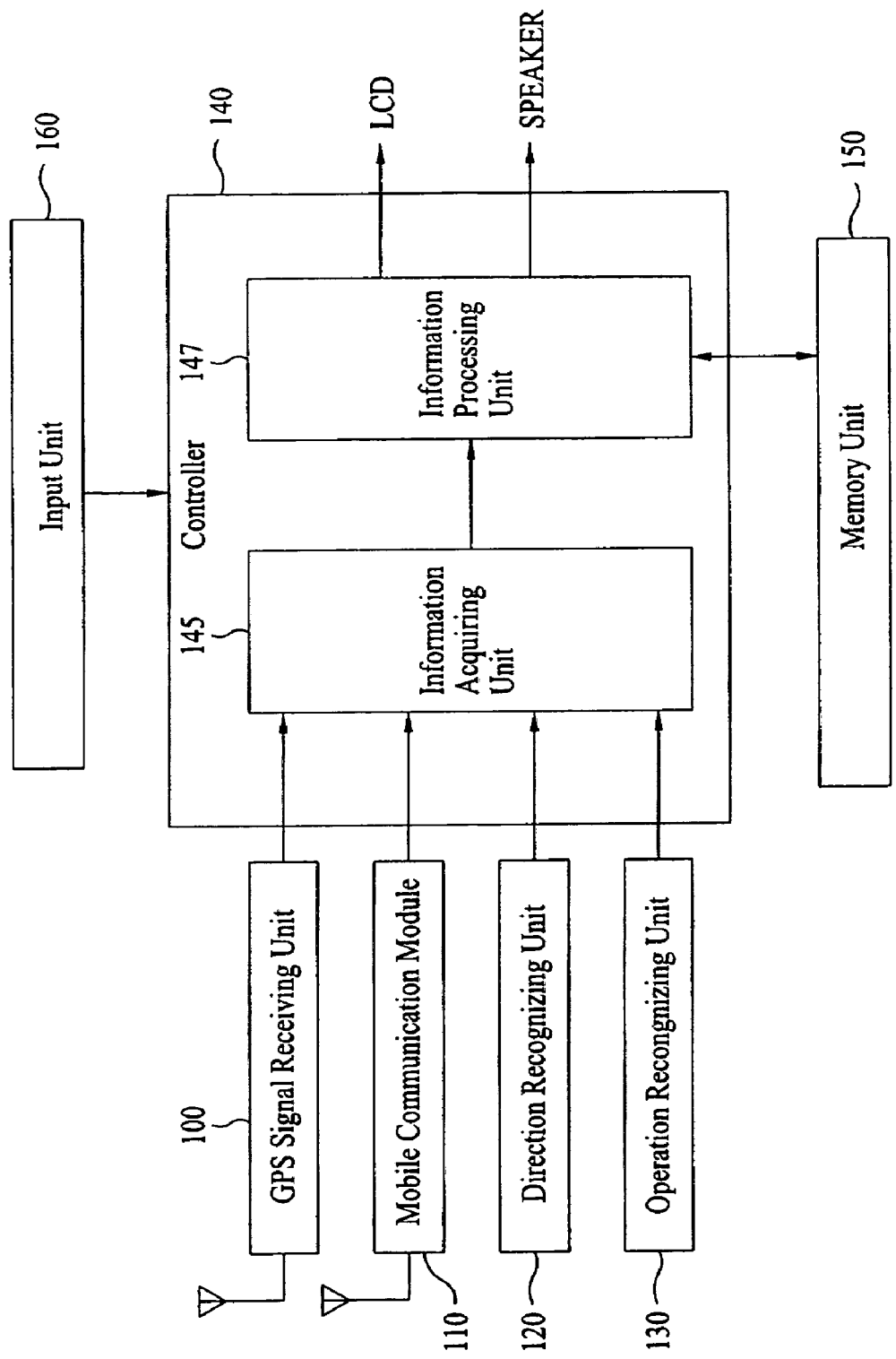
FIG. 1 is a block diagram showing a mobile terminal having a celestial direction guiding function according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

In order to easily describe the present invention, a celestial body includes all universal objects in the sky which can be identified by an astronomical telescope or naked eyes of a person, such as stars, constellations, comets and milky ways.

In general, the position of the celestial body can be represented in a coordinate system for representing the celestial body. Representative examples of the coordinate system include a horizontal coordinate system, an equatorial coordinate system, an ecliptic coordinate system, and a galactic coordinate system.

The horizontal coordinate system is indicative of a coordinate system in which a reference plane is a horizontal plane, a reference point is a north point, and the celestial body is represented by an azimuth indicating an angular distance from the north point to an intersection of the celestial horizon with the vertical circle passing through the celestial body and the zenith along the horizon in clockwise direction (eastward) and an altitude indicating an angular distance from the intersection to the celestial body. Here, the zenith is represented by '+' and the nadir is represented by '−'.

The equatorial coordinate system is indicative of a coordinate system in which a reference plane is an equatorial plane, a reference point is an equinox point, and the celestial body is represented by a right ascension indicating an angular distance from a vernal equinox to a hour circle passing through the celestial body along the equatorial plane in a rotation direction of the earth and a declination indicating an angular distance from the equatorial plane to the celestial body along hour circle passing through the celestial body. Here, the north pole is represented by '+' and the south pole is represented by '−'.

The ecliptic coordinate system is indicative of a coordinate system in which a reference plane is an ecliptic plane, a reference point is the equinox point, and the celestial body is represented by a celestial longitude indicating an angular distance from the vernal equinox to a great circle passing through the poles of the ecliptic and the celestial body along the ecliptic plane in the rotation direction of the earth and a celestial latitude indicating an angular distance from the ecliptic plane to the celestial body along the great circle passing through the poles of the ecliptic and the celestial body. Here, the north is represented by '+' and the south is represented by '−'.

The galactic coordinate system is indicative of a coordinate system in which a reference plane is a galactic plane (galactic equator), a reference point is a galactic center (archer's direction), and the celestial body is represented by a galactic longitude indicating an angular distance from a galactic center eastward along the galactic equator and a galactic latitude indicating an angular distance from the galactic equator to the celestial body. Here, the north pole of the galaxy is represented by '+' and the south pole of the galaxy is represented by '−'.

Meanwhile, each coordinate system may be converted into the other coordinate systems. For example, the horizontal coordinate system may be converted into the equatorial coordinate system and the equatorial coordinate system may be converted into the horizontal coordinate system. A method of calculating the position of the celestial body using each coordinate system and conversion of the coordinate system into the other coordinate system is well known and thus the detailed description thereof will be omitted.

FIG. 1 is a block diagram showing a mobile terminal having a celestial direction guiding function according to an embodiment of the present invention. Hereinafter, the celestial direction refers to a relative position of the celestial body with respect to the user/observer. Hereinafter, the mobile terminal having the celestial direction guiding function according to the embodiment of the present invention will be described in detail.

The mobile terminal according to the embodiment of the present invention includes a Global Positioning System (GPS) signal receiving unit 100 for receiving a GPS signal, a mobile communication module 110 for transmitting/receiving data to/from a mobile network, a direction recognizing unit 120 for recognizing a direction toward which the top of the mobile terminal is pointing, an operation recognizing module 130 for recognizing an operation of the terminal, a controller 140, a memory unit 150, and an input unit 160.

The GPS signal receiving unit 100 receives the GPS signal so as to acquire position information of the mobile terminal and may receive position information of the United States' global positioning system, the Russian Federation's global orbiting navigation satellite system (GLONASS), and GALILEO which is being developed by the European Union member states.

A representative example of the direction recognizing module 120 is a geomagnetic sensor which is used to sense a magnetic field of the earth and is mainly used for sensing a movement direction of a vehicle such as an automobile, an aircraft, and/or a ship.

In the geomagnetic sensor, drive coils are wound on a circular ring core which is made up of a ferromagnetic body. In detail, the ferromagnetic body includes an X-coil (a coil which is wound in an X-axis direction), a Y-coil (a coil which is wound in a Y-axis direction), and a Z-coil (a coil which is wound in a Z-axis direction) perpendicular to one another at the center of the ring core. When a magnetic line is generated in the ring core of the drive coil, induction voltages generated by combining a magnetic force and a terrestrial magnetism are measured by the X-coil, the Y-coil, and the Z-coil. Further, the direction is sensed by a potential difference between the measured induction voltages. Since the value measured by the geomagnetic sensor may change by a change in temperature or other peripheral magnetic bodies, the value needs to be compensated. The geomagnetic sensor used in the present invention preferably uses three axes including the X-coil, the Y-coil, and the Z-coil as described above and may also use two axes.

Representative examples of the operation recognizing module 130 are an acceleration sensor or a gyro sensor. The acceleration sensor is used to sense dynamic force, such as acceleration, vibration, and impact, and can use inertial force, electrical deformation, and gyro principle.

In the acceleration sensor, acceleration occurs when an object moves, and the measured acceleration can be integrated twice with respect to a time to calculate a movement distance. A three-axes acceleration sensor for measuring a movement distance in an X-axis direction, a Y-axis direction, and a Z-axis direction may be used to measure a spatial change in the operation of the terminal. The acceleration sensor may be operated by a thermal convection method, a piezo-resistive method, or a capacitive method.

The thermal convection type sensor includes a heating body and gas mass which is heated air. The gas mass moves by external movement. The acceleration may be calculated by a change in temperature of the heating body according to the movement of the gas mass.

In the piezo-resistive type sensor, a fine structure is formed using a semiconductor technology such that the structure is sloped by an acceleration direction. Then, a resistance value of the structure is changed and thus current flowing in the structure is changed. Accordingly, a change in current may be recognized as the acceleration.

The capacitive type sensor uses inertial mass by inserting a solid object, which is a solid mass, into the sensor. When force is not externally applied, capacitance has a constant value, but when force is applied in a predetermined direction, the solid object moves in a direction opposite to the predetermined direction and thus a capacitance value is changed. The acceleration is measured by calculating the changed capacitance value.

The memory unit 150 stores a predetermined program for controlling an overall operation of the mobile terminal and stores a variety of input/output or processed data when the overall operation of the mobile terminal is performed by the controller 140. In particular, the memory unit 150 may store celestial information which includes various information such as position information of the celestial body on a celestial sphere matched to a celestial body's name. Moreover, the celestial information may include an image of the celestial body, and a legend, an animation, a flash and a moving image, all of which are associated with stars and constellations, in addition to the position information of the celestial body on the celestial sphere.

The input unit 160 allows a user to input a variety of information or commands, such as a touch screen or a keypad having a variety of keys. In the embodiment shown in FIG. 1, the user may input the celestial body's name using the input unit 160.

The controller 140 controls the overall operation of the mobile terminal. In particular, the controller 140 controls the GPS signal receiving unit 100, the mobile communication module 110, the direction recognizing module 120, the operation recognizing module 130, the memory unit 150, and the input unit 160. Furthermore, the controller 140 includes an information acquiring part 145 for acquiring terminal position information, time information, and terminal direction information including an azimuth and an altitude of the terminal. Hereinafter and throughout the description, the terminal direction refers to the direction towards which the top of the mobile terminal is pointing. Here, the sensor used to detect or measure the direction/location of the celestial body is located on top side of the mobile terminal. However, the sensor can be placed anywhere in the mobile terminal and is not limited to the top side. The controller 140 further includes an information processing unit 147 for outputting celestial information corresponding to the position information, the time information, and the direction information received from the information acquiring unit 145 by searching the memory unit 150.

The information acquiring unit 145 acquires and outputs the position information of the mobile terminal using the GPS signal received via the GPS signal receiving unit 100 or a mobile communication base station system parameter received via the mobile communication module 110. A representative example of the position information is latitude/inclination information.

Meanwhile, the information acquiring unit 145 may directly receive the position information from the user via the input unit 160. For example, although the user of the mobile terminal is located in Seoul, Korea, the user can receive information on the constellations in the sky of Washington D.C. by directly inputting the city name or in this case, Washington D.C.

The information acquiring unit 145 acquires and outputs the time information using the GPS signal received via the GPS signal receiving unit 100 or the mobile communication base station system parameter received via the mobile communication module 110.

The information acquiring unit 145 may directly receive the time information from the user via the input unit 160, similar to the position information. For example, although the current time is 9 p.m., Dec. 12, 2005, the user may input 10 p.m., Jan. 1, 2006.

The information acquiring unit 145 may acquire the terminal direction information by measuring a change in azimuth and altitude using the direction recognizing module 120 and the operation recognizing module 130.

The direction information may include information on three-dimensional azimuth and altitude. The reason why the direction information includes the information on the three-dimensional azimuth and altitude is to allow the user to observe the sky located on the opposite side of the earth via the mobile terminal even if the terminal is pointed toward the other side of the earth, without limiting the range of the sky (celestial sphere), which can be observed at the current position of the mobile terminal or the user, to the sky which can be observed by the naked eyes of the user.

Hereinafter, discussion regarding a case where the direction recognizing module 120 is the geomagnetic sensor, and the operation recognizing module 130 is the acceleration sensor will be made.

For example, the information acquiring unit 145 acquires and outputs the direction information including the azimuth and the altitude of the terminal using the geomagnetic value received from the direction recognizing module 120 and the acceleration value received from the operation recognizing module 130.

The azimuth and the altitude include the terms used in respective coordinate systems for indicating the position of the celestial body. For example, in the equatorial coordinate system, the azimuth is the right ascension and the altitude is the declination.

The information acquiring unit 145 may measure the azimuth and the altitude of the terminal only using the geomagnetic value received from the geomagnetic sensor. Alternatively, the information acquiring unit 145 may further use the acceleration value received from the acceleration sensor so as to improve an acquisition speed for acquiring the direction information and accuracy of the direction information.

The information acquiring unit 145 may directly receive the direction information including the azimuth and the altitude from the user via the input unit 160.

The information processing unit 147 outputs the celestial information corresponding to the position information, the time direction and the direction information received from the information acquiring unit 145 or by searching the information in the memory unit 150. For example, the information processing unit 147 calculates the horizontal coordinate system corresponding to the position information, the time information, and the direction information, converts the calculated horizontal coordinate system into a coordinate system of the celestial information stored in the memory unit 150, and searches the memory unit 150 using the converted coordinate system. By such an operation, the celestial information represented in the converted coordinate system or the horizontal coordinate system may be outputted.

For example, when the coordinate system of the celestial information stored in the memory unit 150 is the equatorial coordinate system, the information processing unit 147 converts the calculated horizontal coordinate system into the equatorial coordinate system.

Meanwhile, there are various methods of outputting the celestial information. For example, the images of the stars or the constellations stored in the memory unit 150 or text information associated thereof may be displayed or audibly outputted. Alternatively, the information may be outputted in a form of a moving image, an animation, or a flash.

The range of the outputted celestial information can be previously determined or set by the user. That is, the information processing unit 147 outputs the celestial information in a predetermined area including the horizontal coordinate or the converted coordinate. At this time, the range of the predetermined area may be previously determined or adjusted by the user. That is, the user may increase or decrease the size of the area in a specific direction of the mobile terminal, similar to a zoom-in/zoom-out function of a camera.

Figure 2:
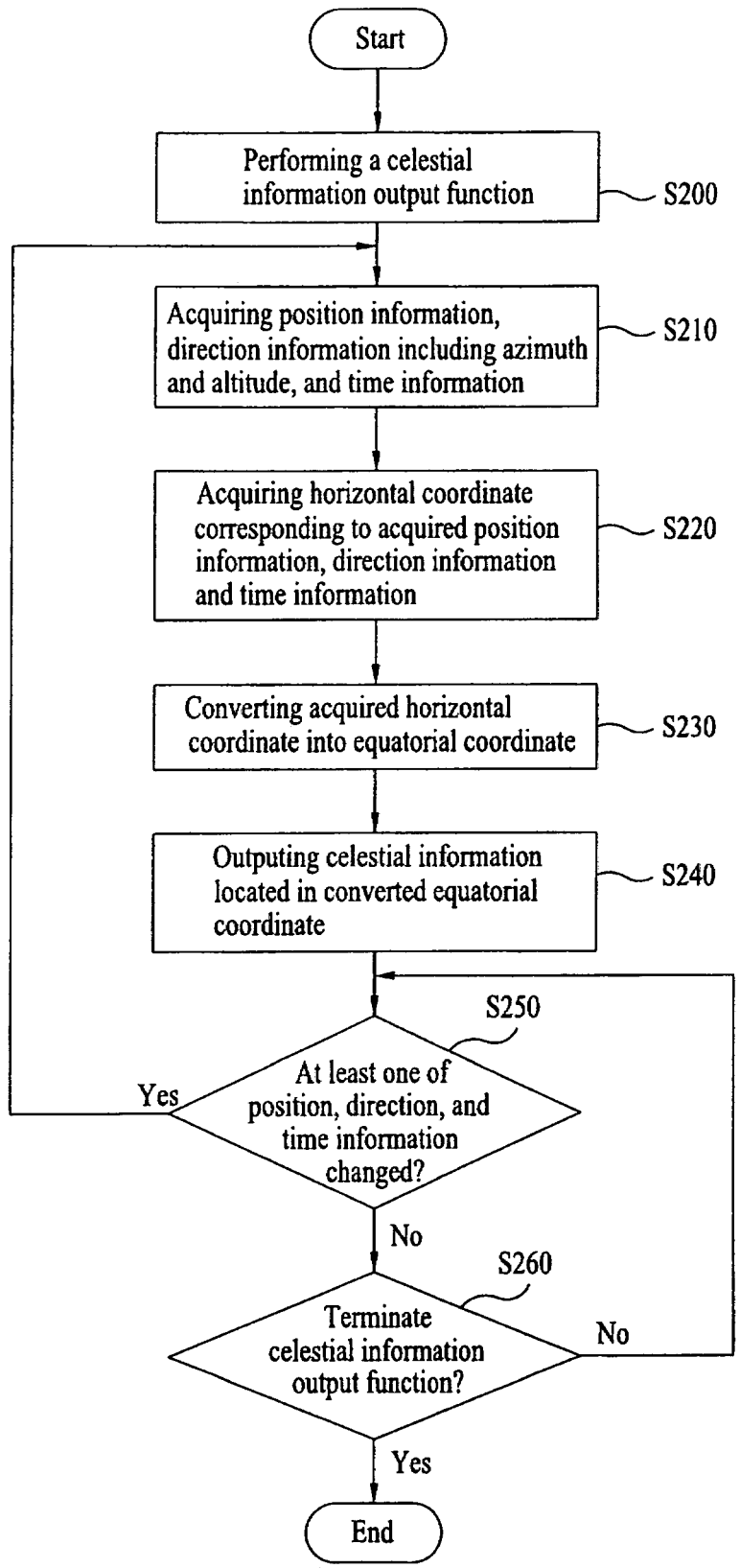
FIG. 2 is a flowchart illustrating a method of outputting celestial information according to a preferred embodiment of the present invention.

FIG. 2 is a flowchart illustrating a method of outputting celestial information according to an embodiment of the present invention. The method of outputting the celestial information according to the preferred embodiment of the present invention will be described in detail with reference to FIG. 2.

First, when the mobile terminal performs a celestial information output function (S200), the terminal position information, the terminal direction information including the azimuth and the altitude of the terminal and the time information are acquired (S210).

The position information may be acquired by receiving the GPS signal or using the mobile communication base station system parameter received via the mobile network. The position information may be, for example, latitude/inclination information.

The direction information includes the azimuth and the altitude of the terminal. That is, the direction information includes the azimuth and the altitude of the celestial sphere toward which a reference plane or a reference point of the terminal is directed.

Here, the azimuth and the altitude include the terms used in all the coordinate systems indicating the position of the celestial body. That is, in the horizontal coordinate system, the azimuth is the azimuth and the altitude is the altitude. In the equatorial coordinate system, the azimuth is the right ascension and the altitude is the declination.

The direction information may be acquired by measuring the change in the azimuth and altitude using the geomagnetic sensor and the acceleration sensor. In order to the increase the acquisition speed and the accuracy, both the geomagnetic sensor and the acceleration sensor are used for acquiring the direction information.

The time information may be acquired by receiving the GPS signal or using the mobile communication base station system parameter received via the mobile network. The time information includes date and time.

Meanwhile, at least one of the position information, the direction information, and the time information may be directly inputted by the user. In particular, in order to receive the celestial information of the sky in a specific direction at a position different from the position of the user and/or a time different from the current time, necessary information needs to be directly inputted by the user.

The horizontal coordinate corresponding to the acquired position information, the direction information and the time information is acquired (S220). The acquired horizontal coordinate is converted into the equatorial coordinate (S230), and the celestial information located in the converted equatorial coordinate system is outputted (S240).

The coordinate converting step S230 is performed if the celestial information stored in a database is represented in the equatorial coordinate system. If the celestial information stored in the database is represented in the other coordinate system, the coordinate system can be converted into the other coordinate system. That is, in the coordinate converting step S230, the coordinate obtained using the acquired position information, direction information, and time information is converted into the coordinate of the celestial information stored in the database. Thereafter, the database is searched using the converted coordinate, and the celestial information corresponding to the coordinate is read. Thus, the coordinate converting step S230 is optional.

In the celestial information output step S240, the celestial information located in the predetermined area including the converted coordinate is outputted. As discussed, the range of the predetermined area may be adjusted by the user, similar to a zoom-in/zoom-out function of a camera.

There are various methods of outputting the celestial information as described above. For example, video information, such as an image or a moving image, may be outputted or the names or the legends of stars or the constellation may be audibly outputted.

In the following step, a determination is made as to whether at least one of the position information, the direction information, and the time information is changed or updated (S250). Based on the determination of step S250, the steps S210, S220, S230 and S240 can be repeated and the celestial information related thereto can be outputted.

In the step S250, the range of the change or update regarding the direction information and the time information may be set broadly.

For example, since the change/update in the celestial information according to the change in the terminal position information is not so large, the change/update in the celestial information according to the change in the terminal position information may not be considered. If the change in the terminal position information is considered, the celestial information may be set to be updated and outputted only if the degree of the change in the terminal position information is very large.

In addition, the change/update in the time information for updating and outputting the celestial information may be set to 30 minutes or 1 hour by the user. Since the degree of the change/update in the celestial information according to the change in the terminal direction is larger than that of the change/update in the celestial information according to the change in the terminal position information or time information, the celestial information may be updated and outputted even if the change in the terminal direction is small.

Thereafter, a determination is made as to whether the celestial information output function should be terminated (S260). If it is determined that the celestial information output function should be terminated, then the celestial information output function is terminated. As a representative example of finishing the celestial information output function, there is a case where a function terminating command is inputted by the user.

Figure 3A:
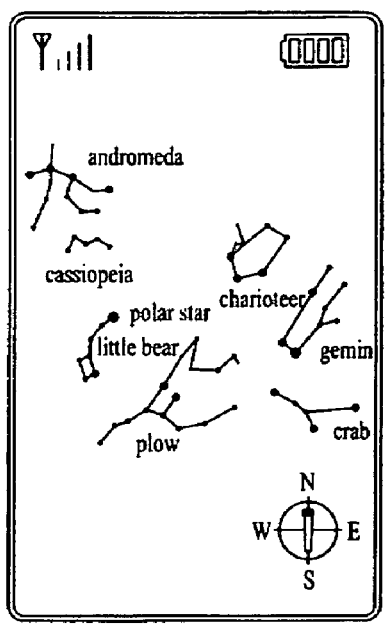
FIGS. 3A to 3D are views showing examples of constellations displayed according to the present invention.
Figure 3B:
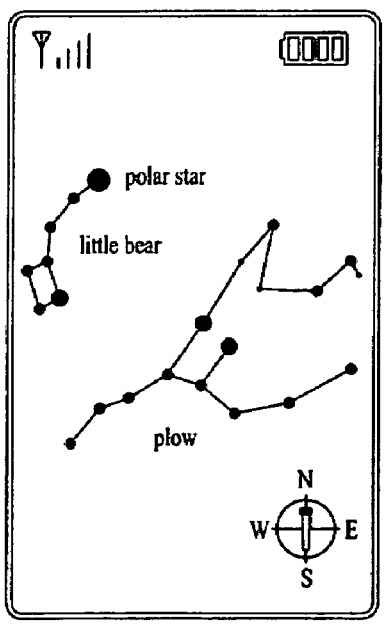
Figure 3C:
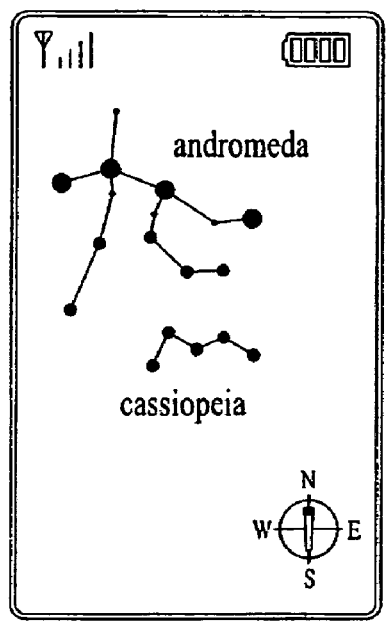
Figure 3D:
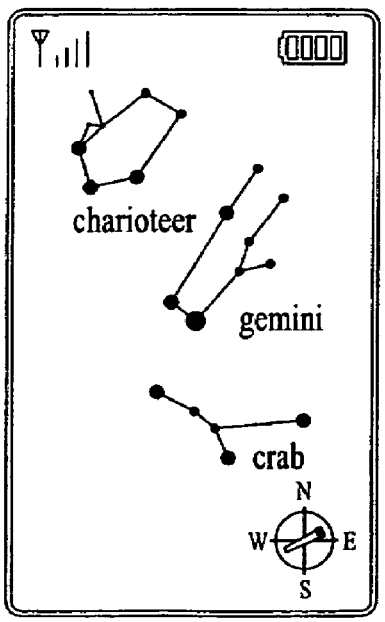

FIGS. 3A to 3D are views showing examples of constellations displayed according to the present invention. FIG. 3A shows an example of constellations in the north sky which is displayed on a screen when the mobile terminal is directed or pointed toward north. FIG. 3B shows a screen displaying constellations in a specific area of the north sky by performing a zoom-in action while the position of the terminal is unchanged as shown in FIG. 3A. FIG. 3C shows a screen displaying constellations located above the constellations shown in FIG. 3B by increasing the altitude of the mobile terminal in a state shown in FIG. 3B. FIG. 3D shows a screen displaying constellations to the east of the constellations shown in FIG. 3B by changing the direction of the mobile terminal or by pointing the top of the mobile terminal to the east.

Further, the user of the mobile terminal may, for example, input information on Gemini to the terminal. The mobile terminal may calculate the celestial position information of the Gemini. The mobile terminal then compares the celestial position information of the constellation input by the user with the terminal direction information, and, if a difference between is outside an error range as the result of comparison, information on the change in the terminal direction may be output to the user.

Figure 4:
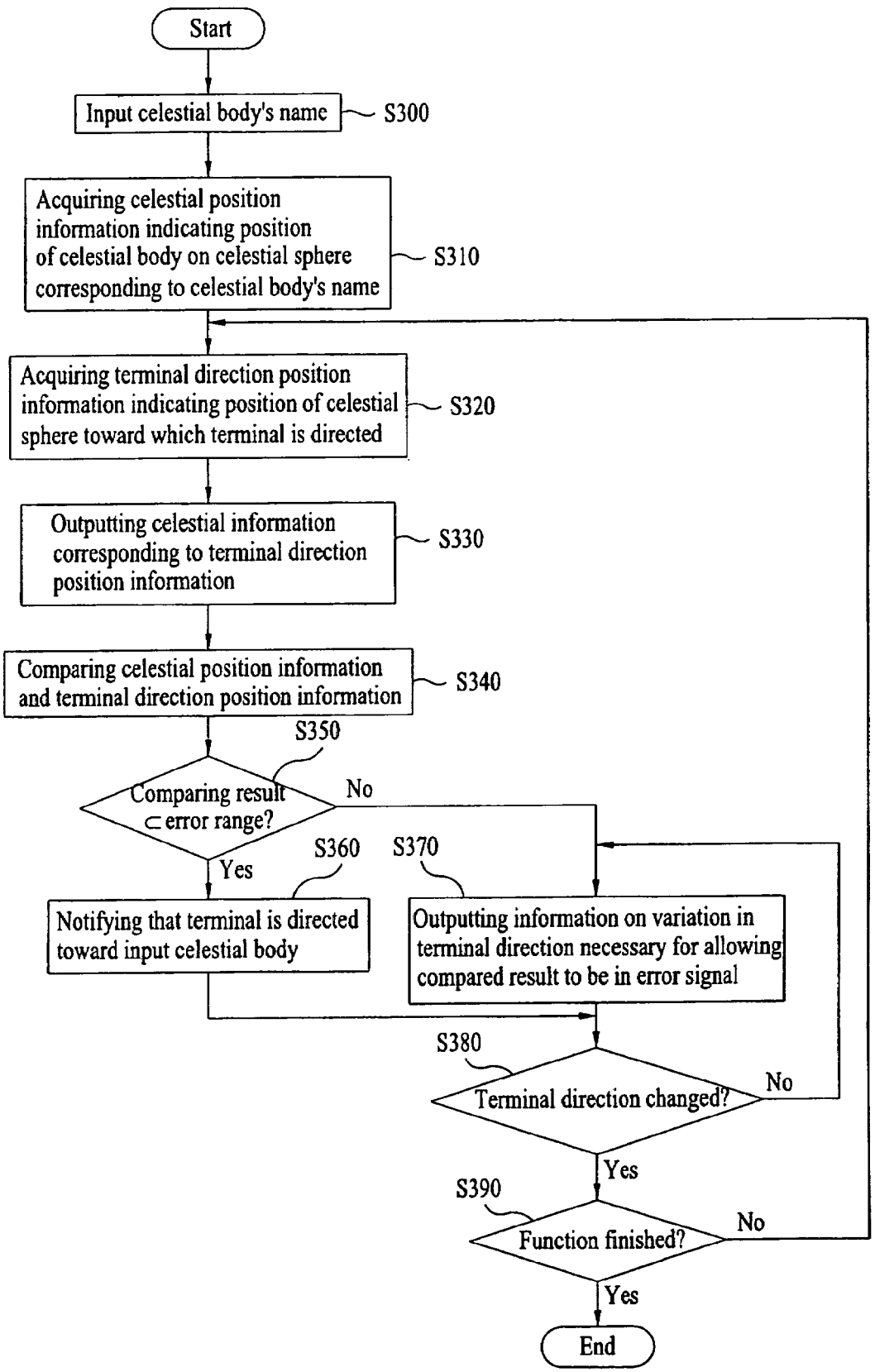
FIG. 4 is a flowchart illustrating a method of outputting celestial information according to another embodiment of the present invention.

FIG. 4 is a flowchart illustrating a method of outputting celestial information according to another embodiment of the present invention.

The method of outputting the celestial information according to the embodiment of the present invention will be described in detail with reference to FIG. 4. The method of outputting the celestial information shown in FIG. 4 may calculate position information of a celestial body inputted by the user and output information on the celestial body.

First, a celestial body's name is inputted (S300) The input celestial body's name includes all the celestial bodies including stars, constellations, comets, and milky ways.

Celestial position information indicating the position of the celestial body on the celestial sphere corresponding to the input celestial body's name is acquired (S310). The celestial position information acquired in the celestial position information acquiring step S310 may be represented in the above-described variety of coordinate systems. Hereinafter, a case where the acquired celestial position information is represented in the equatorial coordinate system will be, for example, described.

Meanwhile, the celestial position information acquiring step S310 may refer to a database to match the celestial body's name to the celestial coordinate represented in a specific coordinate system. The database may be included in the mobile terminal or an external device. If the database is included in the external device, the mobile terminal requests the celestial position information corresponding to the celestial body's name from the external device.

The terminal direction position information, which indicates the position of the terminal on the celestial sphere including the azimuth and the altitude of the terminal, is acquired (S320).

The mobile terminal direction information indicates the position of the celestial sphere toward which the terminal is directed, and not the information on the position of the terminal. The terminal direction information may be represented in the variety of coordinate systems, similar to the celestial position information. An example where the acquired terminal direction information is represented in the horizontal coordinate system will be described in detail with reference to FIG. 5.

The celestial information corresponding to the acquired terminal direction information is outputted (S330). There are various methods of outputting the celestial information. For example, the images of the celestial body may be displayed or text information associated with the name or the legend of the celestial information may be displayed or audibly output. Alternatively, the information may be outputted in a form of a moving image, an animation or a flash.

The acquired celestial position information and the acquired terminal direction information are compared (S340), and a determination is made as to whether the compared result falls within a predetermined error range (S350). The description of the steps S340 will be described in detail with reference to FIGS. 6 and 7.

If the compared result falls within the error range (S350), the terminal direction indicates that the direction toward which the top of the mobile terminal is pointing is correct direction with respect to the location of the inputted celestial body (S360). This information of the terminal direction regarding the celestial body may also be notified using audio information or video information such as a text.

For example, when the user wants the information on the Gemini and the Gemini is found using any one of the above-described methods, the text "current position: Gemini" may be displayed on the screen of the mobile terminal and/or audio information "The current position is the Gemini" may be output via the speaker.

If the compared result falls outside the error range (S350), the information regarding the change in the terminal direction necessary for allowing the compared result to be in the error range is outputted (S370). In other words, the location of the inputted celestial body with respect to the mobile terminal can be provided so that even if the user is facing or pointing elsewhere (which falls outside the error range), the necessary information can be provided so that the user can point in the correct direction.

For example, if the celestial information displayed on the current screen of the terminal is information on Andromeda instead of the information on the Gemini the user wants to find, the information on how to change the direction of the terminal such that the information on the Gemini is displayed on the screen of the terminal is output. An example of the change in the terminal direction will be described with reference to FIGS. 9A and 9B.

That is, the information on the change in the terminal direction is a difference between the celestial position information and the terminal direction information and may include the change direction and the difference in the terminal direction necessary for allowing correction in the error range.

Figure 5:
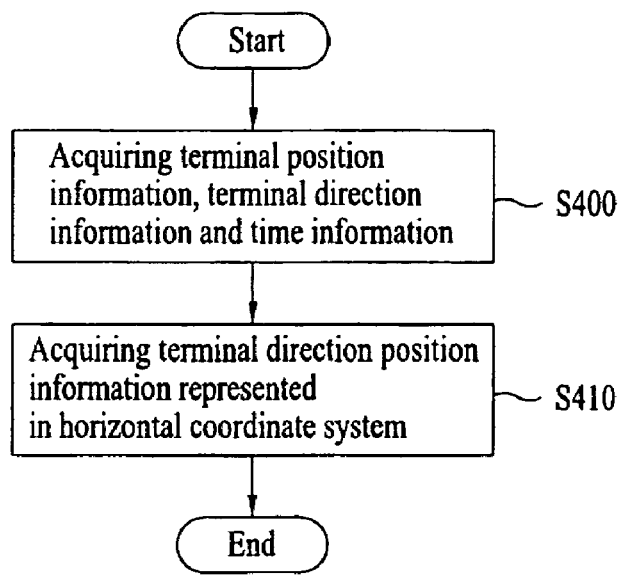
FIG. 5 is a view showing an embodiment of a method of acquiring terminal direction information.

FIG. 5 is a view showing an embodiment of a method of acquiring terminal direction information. The method of acquiring the terminal direction information (S320) will be described in detail with reference to FIG. 5. In FIG. 5, a method of processing the terminal direction information in the horizontal coordinate system will be described.

First, information regarding the terminal position, the terminal direction, and the time are acquired (S400), and then terminal direction information corresponding to the terminal position information, the terminal direction information, and the time information are acquired (S410).

The terminal position information refers to the position of the mobile terminal on earth. The representative position information refers to information on latitude/inclination. The terminal position information may be a specific region name such as Seoul, Korea or Washington, D.C.

Meanwhile, the terminal position information may be directly inputted by the user or may be acquired using the GPS signal received from the GPS satellite. If the mobile terminal includes a mobile communication module for transmitting/receiving data to/from the mobile network, the mobile terminal may receive the system parameter from the mobile communication base station and acquire the terminal position information. In general, the system parameter transmitted from the mobile communication base station includes the latitude/inclination information.

The terminal direction information may be acquired using the direction recognizing module (e.g., a geomagnetic sensor) for recognizing the direction of the terminal. However, the terminal direction information may be acquired using both the direction recognizing module and the operation recognizing module (e.g., an acceleration sensor or a gyro sensor) for recognizing the operation of the terminal. If both the direction recognizing module and the operation recognizing module are used, the acquisition speed for acquiring the direction information and the accuracy of data are improved.

The time information may be acquired via the same means as the terminal position information. That is, the time information may be directly inputted by the user or may be acquired using the GPS signal or the system parameter received from the mobile communication base station if the terminal is a mobile terminal.

If the terminal position information, the terminal direction information, and the time information are acquired, the horizontal coordinate corresponding thereto may be calculated. The calculated horizontal coordinate is the terminal direction position information. As described above, the terminal direction position information does not necessarily need to be represented in the horizontal coordinate.

In order to compare the celestial position information and the terminal direction information, the celestial position information and the terminal direction information are represented in the same coordinate system. For example, if the acquired celestial position information is represented in the equatorial coordinate system and the acquired terminal direction information is represented in the horizontal coordinate system, the acquired celestial position information must be converted from the equatorial coordinate system into the horizontal coordinate system or the acquired terminal direction position information must be converted from the horizontal coordinate system into the equatorial coordinate system.

If the celestial position information acquired by the mobile terminal in the step S310 is represented in the equatorial coordinate system and the acquired terminal direction position information is represented in the horizontal coordinate system, the step S340 of comparing the celestial position information and the terminal direction information will be described in detail.

Figure 6:
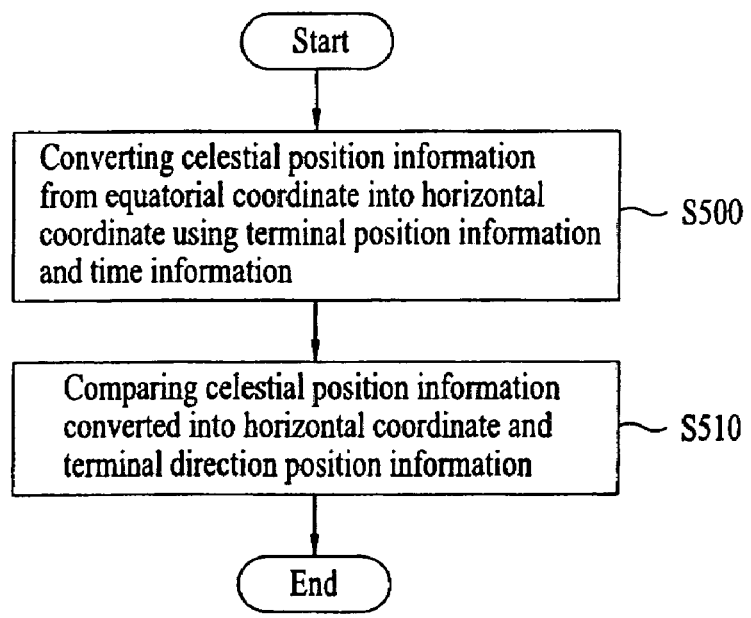
FIG. 6 is a view showing an embodiment of a method of comparing celestial position information and terminal direction information.

FIG. 6 is a view showing an embodiment of the method of comparing the celestial position information and the terminal direction position information.

First, the acquired celestial position information is converted from the equatorial coordinate system into the horizontal coordinate system (S500). At this time, the acquired terminal position information and time information may be used in the step S500. The celestial position information converted into the horizontal coordinate system and the acquired terminal direction position information represented in the horizontal coordinate system are compared with each other (S510).

Figure 7:
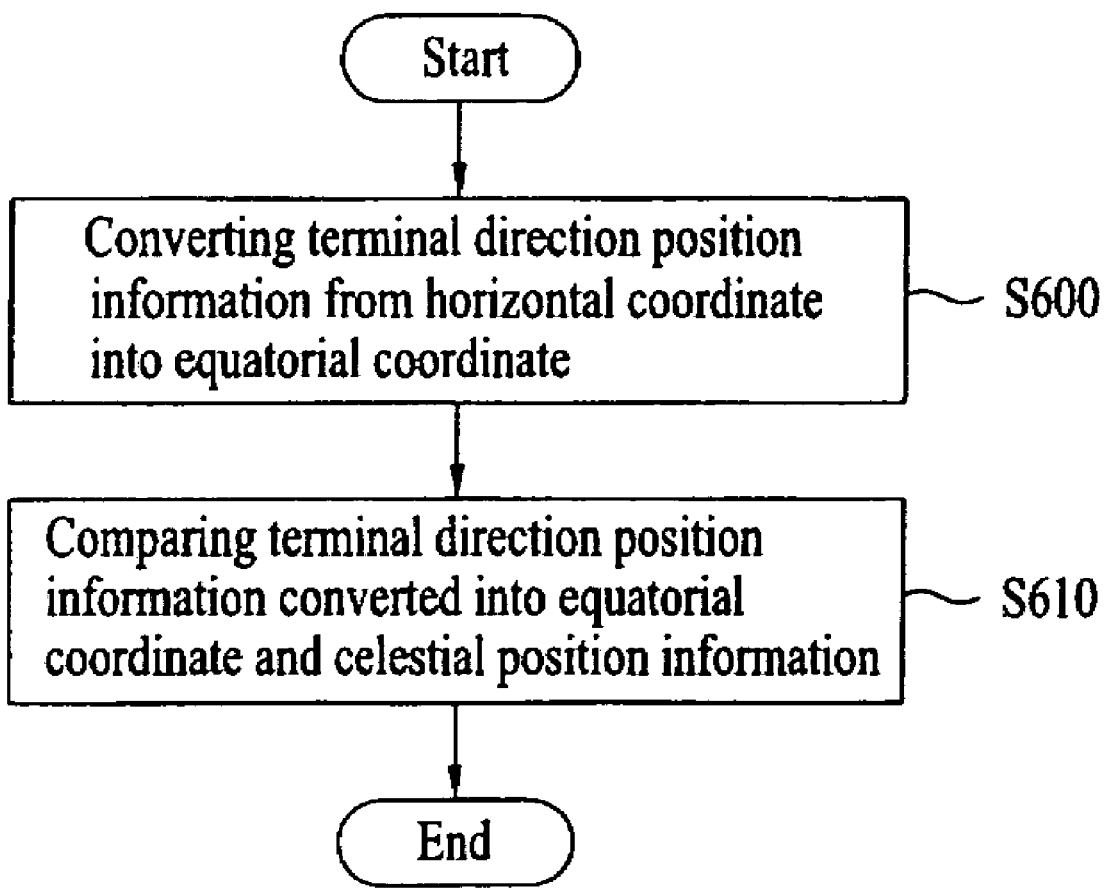
FIG. 7 is a view showing another embodiment of the method of comparing celestial position information and terminal direction information.

FIG. 7 is a view showing another embodiment of the method of comparing the celestial position information and the terminal direction position information.

First, the terminal direction information is converted from the horizontal coordinate system into the equatorial coordinate system (S600). The terminal direction information converted into the equatorial coordinate system and the celestial position information represented in the equatorial coordinate system are compared with each other (S610).

In the comparison between the celestial position information and the terminal direction information (S510 or S610), both the azimuth and the altitude are compared. As discussed, the error range may be set by the user or may be previously set. If the user wishes to receive detailed information to accurately find the position of a desired celestial body, the error range may be set to be small and if the user wants to rapidly and approximately find the position of the desired celestial body, the error range may be set to be large.

Figure 8:
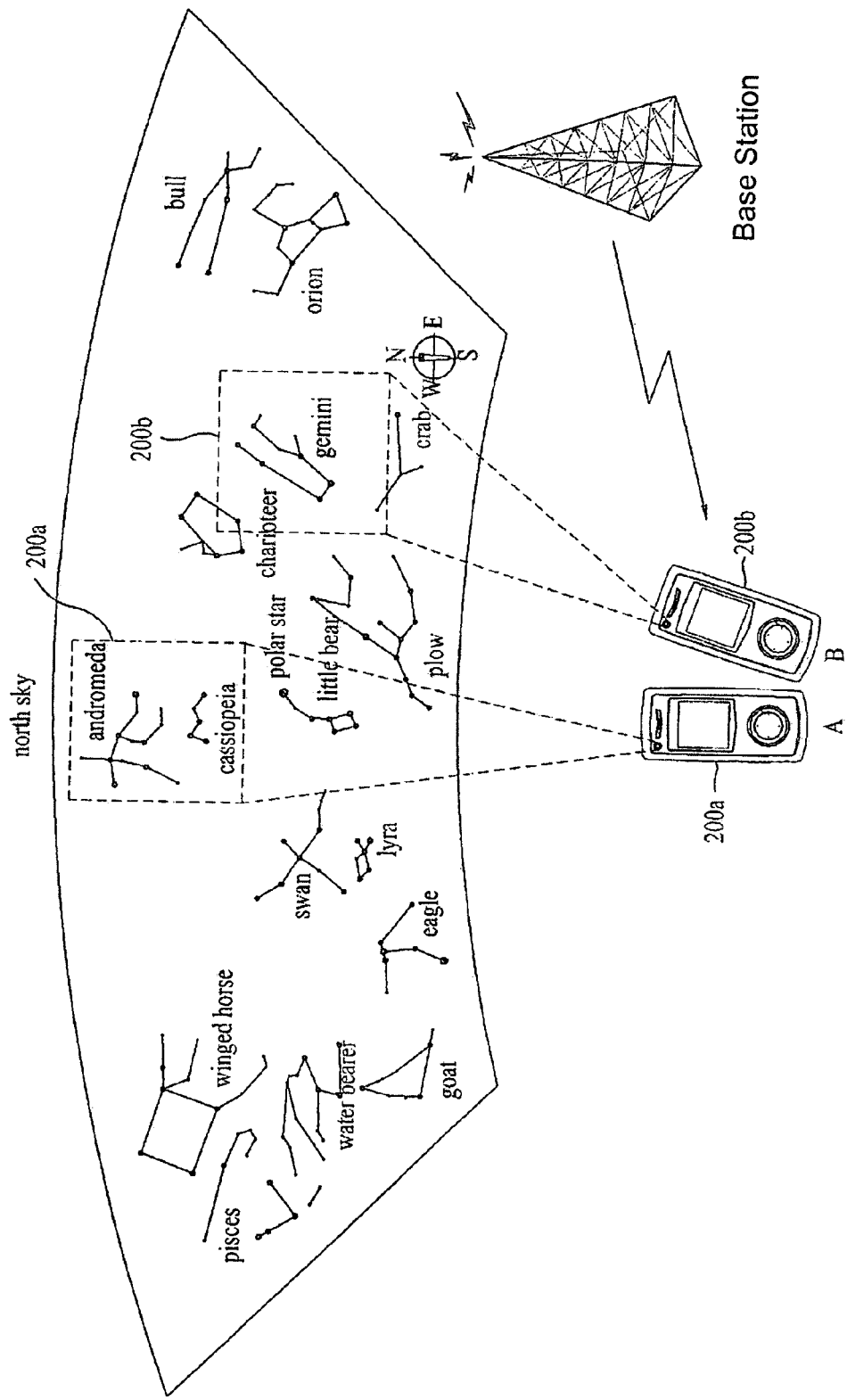
FIG. 8 is a view showing an example of celestial observation using the mobile terminal according to the present invention.

FIG. 8 is a view showing an example of celestial observation using the mobile terminal according to the present invention. The mobile terminal according to the present invention may output the information on the celestial body located on the celestial sphere, toward which the terminal is directed, using video information or audio information.

The mobile terminal may acquire the terminal direction position information and output Andromeda and/or Cassiopeia located on the celestial sphere toward which the terminal is directed (200a). If the user inputs a desired constellation (e.g., Gemini), the mobile terminal may calculate the change in the terminal direction so as to display the input constellation, and display information on the Gemini which is inputted by the user (200b).

Figure 9A:
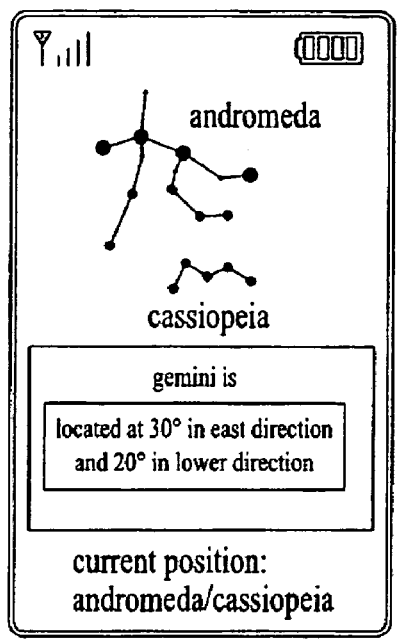
FIGS. 9A and 9B are views showing an example of outputting a change in terminal direction according to the present invention.
Figure 9B:
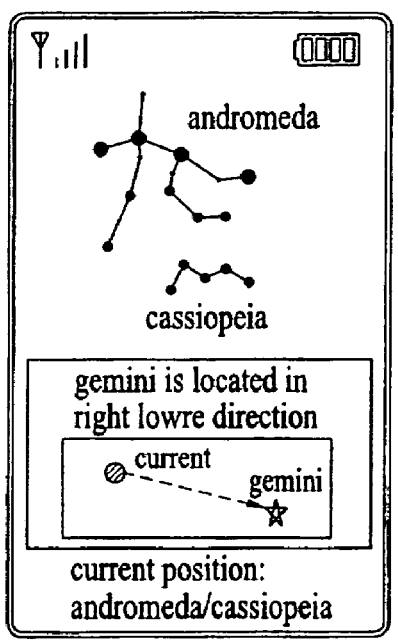

FIGS. 9A and 9B are views showing an example of outputting a change in terminal direction according to the present invention.

FIG. 9A shows the Andromeda and the Cassiopeia which are displayed on the screen if the terminal direction acquired according to the present invention indicates the Andromeda and the Cassiopeia. With respect to the Gemini the user wants to observe, a direction guiding text "30° in the east direction" and "20° in a south direction" is displayed. The current position is provided on the bottom end of the screen using text information "current position: Andromeda/Cassiopeia". The current position provided using the text information on the bottom end of the screen can change depending on the change in the terminal direction.

FIG. 9B shows another example of outputting the information on the change in the terminal direction output according to the present invention. With respect to the Gemini the user wants to find, text information "right lower side or south-east direction" is provided and the current position, and the position of the Gemini are provided using the video information such that the direction is intuitively guided to the user.

The information on the change in the terminal direction output according to the present invention may be outputted using the video information as shown in FIGS. 9A and 9B or may be simultaneously or separately outputted using the audio information. For example, the audio information "turn 30° in the east direction and 20° in the south direction" may be outputted via the speaker of the mobile terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a mobile communication module configured to communicate with a mobile network;
   a memory unit storing celestial information including images of celestial bodies and position information of the celestial bodies on a celestial sphere;
   an input unit configured to receive a user-selected time different from a current terminal time;
   an information acquiring unit configured to acquire the current terminal time, a current terminal position, and a current terminal pointing direction including three-dimensional azimuth and altitude coordinates of the mobile terminal;
   a displaying unit; and
   an information processing unit configured to extract and display a stored image of a celestial body on the displaying unit that 1) corresponds with the current terminal pointing direction including the three-dimensional azimuth and altitude coordinates of the mobile terminal without having to view a range of the sky, and 2) that corresponds with at least one of the user-selected time and the current terminal time,
   wherein when the acquired current terminal pointing direction including the three-dimensional azimuth and altitude coordinates indicates the terminal is pointed downward towards the Earth, the information processing unit is further configured to extract and display a stored image of a celestial body of the sky on the opposite side of Earth corresponding to said at least one of the user-selected time and the current terminal time.

2. The mobile terminal of claim 1, wherein the position information of the celestial bodies and the current terminal pointing direction are represented in different coordinate systems.

3. The mobile terminal of claim 1, further comprising:
   an operation recognizing module configured to recognize a movement of the mobile terminal; and
   a direction recognizing module configured to recognize the direction of the mobile terminal.

4. The mobile terminal of claim 3, wherein the operation recognizing module is any one of an acceleration sensor and a gyro sensor.

5. The mobile terminal of claim 3, wherein the direction recognizing module is a geomagnetic sensor.

6. The mobile terminal of claim 1, wherein when the acquired current terminal pointing direction including the three-dimensional azimuth and altitude coordinates indicates the terminal is pointed towards the North, the information processing unit is further configured to extract and display a stored image of a celestial body of the North sky corresponding to said at least one of the user-selected time and the current terminal time.

7. The mobile terminal of claim 1, wherein when the acquired current terminal pointing direction including the three-dimensional azimuth and altitude coordinates indicates the terminal is pointed towards the East, the information processing unit is further configured to extract and display a stored image of a celestial body of the East sky corresponding to said at least one the user-selected time and the current terminal time.

8. The mobile terminal of claim 1, wherein the stored image of the celestial body is one of a still image and a moving image.

9. The mobile terminal of claim 1, wherein if the user-selected time is not received by the input unit, the information processing unit is further configured to extract and display a stored image of a celestial body on the displaying unit that 1) corresponds with the current terminal pointing direction, and 2) that corresponds with the current terminal time.

10. The mobile terminal of claim 1, wherein if the user-selected time is received by the input unit, the information processing unit is further configured to extract and display a stored image of a celestial body on the displaying unit that 1) corresponds with the current terminal pointing direction, and 2) that corresponds with the user-selected time.

11. The mobile terminal of claim 1, wherein when the acquired current terminal pointing direction including the three-dimensional azimuth and altitude coordinates indicates azimuth and/or altitude coordinates have changed, the information processing unit is further configured to extract and display a stored image of a celestial body corresponding to the changed azimuth and/or altitude coordinates and said at least one the user-selected time and the current terminal time.

12. The mobile terminal of claim 1, wherein the input unit is further configured to receive from the user a desired celestial body, and
wherein the information processing unit is further configured to extract and display information concerning the input desired celestial body indicating a relative positioning of the desired celestial body with respect to the celestial body currently being displayed that corresponds with the current terminal pointing direction and said at least one of the user-selected time and the current terminal time.

13. A method of controlling a mobile terminal, the method comprising:
communicating with a mobile network;
receiving a user-selected time different from a current terminal time;
acquiring the current terminal time, a current terminal position, and a current terminal pointing direction including three-dimensional azimuth and altitude coordinates of the mobile terminal; and
extracting and displaying a stored image of a celestial body on a displaying unit of the terminal that 1) corresponds with the current terminal pointing direction including the three-dimensional azimuth and altitude coordinates of the mobile terminal without having to view a range of the sky, and 2) that corresponds with at least one of the user-selected time and the current terminal time,
wherein when the acquired current terminal pointing direction including the three-dimensional azimuth and altitude coordinates indicates the terminal is pointed downward towards the Earth, the extracting and displaying steps extracts and displays a stored image of a celestial body of the sky on the opposite side of Earth corresponding to said at least one of the user-selected time and the current terminal time.

14. The method of claim 13, wherein position information of the celestial bodies and the current terminal pointing direction are represented in different coordinate systems.

15. The method of claim 13, wherein when the acquired current terminal pointing direction including the three-dimensional azimuth and altitude coordinates indicates the terminal is pointed towards the North, the extracting and displaying steps extracts and displays a stored image of a celestial body of the North sky corresponding to said at least one of the user-selected time and the current terminal time.

16. The method of claim 13, wherein when the acquired current terminal pointing direction including the three-dimensional azimuth and altitude coordinates indicates the terminal is pointed towards the East, the information processing unit is further configured to extract and display a stored image of a celestial body of the East sky corresponding to said at least one the user-selected time and the current terminal time.

17. The method of claim 13, wherein the stored image of the celestial body is one of a still image and a moving image.

18. The method of claim 13, wherein if the user-selected time is not received, the extracting and displaying step extracts and displays a stored image of a celestial body on the displaying unit that 1) corresponds with the current terminal pointing direction, and 2) that corresponds with the current terminal time.

19. The method of claim 13, wherein if the user-selected time is received by the input unit, the extracting and displaying step extracts and displays a stored image of a celestial body on the displaying unit that 1) corresponds with the current terminal pointing direction, and 2) that corresponds with the user-selected time.

20. The method of claim 13, wherein when the acquired current terminal pointing direction including the three-dimensional azimuth and altitude coordinates indicates azimuth and/or altitude coordinates have changed, the extracting and displaying step extracts and displays a stored image of a celestial body corresponding to the changed azimuth and/or altitude coordinates and said at least one the user-selected time and the current terminal time.

21. The method of claim 13, further comprising:
receiving from the user a desired celestial body,
wherein the extracting and displaying step extracts and displays information concerning the input desired celestial body indicating a relative positioning of the desired celestial body with respect to the celestial body currently being displayed that corresponds with the current terminal pointing direction and said at least one of the user-selected time different and the current terminal time.

* * * * *